United States Patent
Timofeev et al.

(10) Patent No.: US 11,414,134 B2
(45) Date of Patent: Aug. 16, 2022

(54) ELECTRIC DRIVE SUPPORTING COMPONENT PLATFORM FOR SEMI-TRACTOR AND TRUCK VEHICLES

(71) Applicant: DAIMLER AG, Stuttgart (DE)

(72) Inventors: Nikita Timofeev, Portland, OR (US); Karthik Raju, Mysore (IN); Chris Streck, Portland, OR (US); Bhaskar Chikkamarigowda, Bengaluru (IN); Vijay Arokiaraj, Bangalore (IN); Ashok Marukuli, Bengaluru (IN)

(73) Assignee: MERCEDES-BENZ GROUP AG, Stuttgart (DE)

( * ) Notice: Subject to any disclaimer, the term of this patent is extended or adjusted under 35 U.S.C. 154(b) by 46 days.

(21) Appl. No.: 17/066,789

(22) Filed: Oct. 9, 2020

(65) Prior Publication Data

US 2021/0129915 A1    May 6, 2021

(30) Foreign Application Priority Data

Oct. 14, 2019 (IN) .............................. 201911041598

(51) Int. Cl.
*B60K 1/04* (2019.01)
*B62D 25/08* (2006.01)
(Continued)

(52) U.S. Cl.
CPC .............. *B62D 25/082* (2013.01); *B60K 1/00* (2013.01); *B60K 1/04* (2013.01); *B60K 11/04* (2013.01);
(Continued)

(58) Field of Classification Search
CPC .............. B60K 1/04; B60K 1/00; B60K 11/04
See application file for complete search history.

(56) References Cited

U.S. PATENT DOCUMENTS

| 4,909,565 A | 3/1990 | Harasaki et al. |
| 5,749,589 A * | 5/1998 | Hopkins ................. B62B 3/001 280/47.34 |

(Continued)

FOREIGN PATENT DOCUMENTS

| CN | 205202703 U | 5/2016 |
| CN | 106314314 A | 1/2017 |

(Continued)

OTHER PUBLICATIONS

HDT Staff, "Meritor Invests in TransPower to Accelerate Electric Platform Development," Dec. 7, 2017, https://www.truckinginfo.com/143361/meritor-invests-in-transpower-to-accelerate-electric-platform-development.

*Primary Examiner* — Jonathan Ng
*Assistant Examiner* — James J Triggs
(74) *Attorney, Agent, or Firm* — Patent Portfolio Builders PLLC (57) ABSTRACT

A platform to replace under-the-hood engine assembly of a conventional internal combustion engine vehicle. The platform includes a backbone frame and a tower frame secured to the backbone frame towards a vehicle front. The backbone frame and the tower frame are secured to chassis frame of the vehicle through a three point isolator mounting system. A plurality of electric drive components, such as battery radiators, electric-axle and high-voltage accessories cooling system radiator, air conditioning condenser, cooling fans, brake retarder, DC-DC voltage converter(s), HVAC compressor, inverter(s), low voltage batteries package, air compressor, pumps, etc. are secured to the backbone frame and the tower frame to support the electric motor of the electric vehicle.

10 Claims, 5 Drawing Sheets

(51) Int. Cl.
*B60K 1/00* (2006.01)
*B60K 11/04* (2006.01)
*B62D 25/12* (2006.01)
*B62D 65/10* (2006.01)

(52) U.S. Cl.
CPC ............. *B62D 25/12* (2013.01); *B62D 65/10* (2013.01); *B60K 2001/005* (2013.01); *B60K 2001/006* (2013.01)

(56) References Cited

U.S. PATENT DOCUMENTS

| | | | |
|---|---|---|---|
| 6,022,048 | A | 2/2000 | Harshbarger et al. |
| 6,192,693 | B1 * | 2/2001 | Kloppenberg .......... F25C 5/187 |
| | | | 250/222.1 |
| 8,783,396 | B2 * | 7/2014 | Bowman ................ B60L 58/21 |
| | | | 180/65.285 |
| 2005/0017421 | A1 * | 1/2005 | Huprikar ............... F16F 1/3732 |
| | | | 267/141 |
| 2009/0236478 | A1 | 9/2009 | Kramer et al. |
| 2013/0240273 | A1 | 9/2013 | Langer et al. |

FOREIGN PATENT DOCUMENTS

| | | |
|---|---|---|
| CN | 206826385 U | 1/2018 |
| CN | 207225060 U | 4/2018 |
| DE | 102013020928 A1 | 7/2014 |
| DE | 102014005290 A1 | 10/2015 |
| EP | 2554420 A1 | 2/2013 |
| EP | 3616956 A1 | 3/2020 |
| GB | 2443272 A | 4/2008 |
| JP | S5523910 U | 2/1980 |
| JP | S55114772 U | 8/1980 |
| JP | 2009137443 A | 6/2009 |
| JP | 2015205629 A | 11/2015 |
| JP | 6416858 B2 | 10/2018 |
| WO | 2009016976 A1 | 2/2009 |
| WO | 2015137869 A1 | 9/2015 |

* cited by examiner

ELECTRIC DRIVE SUPPORTING COMPONENT PLATFORM FOR SEMI-TRACTOR AND TRUCK VEHICLES

CROSS-REFERENCE TO RELATED APPLICATIONS

The present application claims priority under 35 U.S.C. § 119 to Indian Patent Application No. 201911041598, filed Oct. 14, 2019, the entire disclosure of which is herein expressly incorporated by reference.

TECHNICAL FIELD

The present disclosure relates generally to the technical field of electric drive systems in automobiles. In particular, the present disclosure pertains to a platform for mounting and installing electric drive system components, the platform being configurable to interface with conventional vehicle architecture, such as conventional vehicle architecture having been configured to interface with a conventional internal-combustion engine, thereby facilitating conversion of conventional vehicles to electric vehicles and/or facilitating production of electric vehicles alongside production of conventional vehicles.

BACKGROUND OF THE INVENTION

In a conventional semi-truck/tractor, the under-hood compartment (hereinafter also referred to as the engine compartment) is occupied by an internal combustion engine assembly with a radiator positioned in the front of the compartment for cooling purposes. A conventional engine assembly contains belt and/or gear driven auxiliary components that support various functions of a diesel or gasoline vehicle, such as delivery of air, hydraulic fluid, coolant, Freon, and the like.

An electric drive vehicle has one or more electric motors which receive power from a main battery pack via an inverter controller, which controls an inverter coupled to each of the one or more electric motors. The inverter controller controls the speed of the electric motor(s), based on commands from the main vehicle controller, by controlling the amount of power supplied from the main battery pack to the one or more electric motors. The electric motors of the electric vehicles are also supplemented with auxiliary components, such as a cooling system, a battery management system, an inverter, and the like. These components occupy a substantial amount of space.

Due to various factors ranging from sustainability, environmental concerns, and the rising prices of fossil fuels, the market for electric vehicles has grown rapidly in recent years. There is an appreciable need not only to introduce new electric vehicles into the automobile and truck market, but also for conversion of conventional internal combustion engine vehicles to electric vehicles. In order to encourage conversions of conventional internal combustion engine vehicles to electric vehicles, the conversion should be cost effective to make it accessible to a large portion of the population. It would also be beneficial to expedite the process of reducing dependence on fossil fuels, such as by reducing design and assembly efforts (and costs) associated with accommodating electric drive systems. Accordingly, it would be beneficial to have a system for and method of utilizing an electric drive system within a vehicle that was designed for a conventional internal combustion engine drive system.

U.S. Pat. No. 6,022,048A discloses a drive motor mounting module for a hybrid electric vehicle and a motor mounting module in combination with the hybrid electric vehicle. More specifically, the drive motor mounting module is comprised of a drive motor, a front motor mount support bracket, a chassis front support bracket, a chassis cross member, two rear motor mount brackets, two cross braces, two vertical channels, and two motor module locating mounts. The entire module can be modularly assembled prior to installation to the vehicle chassis on a main assembly line. The mounting module engages the drive motor to the chassis by three-point mountings. Because the vehicle is a hybrid electric vehicle, the vehicle includes an engine arranged in the engine compartment and the electric drive motor and supporting components are arranged in locations other than the engine compartment. There is no discussion of how to arrange the electrical components supporting the electric drive motor in the engine compartment, which is already occupied by an internal engine. Further, U.S. Pat. No. 6,022,048A fails to provide any solution to the need of having common mounting interfaces and volume requirements as conventional drive systems, such that the same under-the-hood compartment space may be utilized for holding a variety of drive systems without making significant changes to the design of the vehicle itself.

There is, therefore, a need to provide an improved, simple and cost effective solution for conversion of a conventional fossil fuel based vehicle to an electric vehicle and/or for facilitating simultaneous production of each.

SUMMARY OF THE INVENTION

Exemplary embodiments of the present disclosure are directed to an efficient and cost effective solution that meets the requirement of converting conventional fossil fuel based vehicles to electric vehicle.

Exemplary embodiments of the present disclosure are also directed to an assembly or platform for mounting and installation of all the components and accessories supporting an electric drive system except for the electric drive itself and the high-voltage batteries.

Exemplary embodiments of the present disclosure are further directed to an electric drive mounting platform that fits within the conventional vehicle architecture.

Exemplary embodiments of the present disclosure are also directed to an electric drive mounting platform that enables simultaneous production of electric drive vehicles with production of internal combustion engine drive vehicles.

Exemplary embodiments of the present disclosure are further directed to an electric drive mounting platform that fits within a space vacated by internal combustion engine of the vehicle, i.e., within the engine compartment normally occupied by a gas or diesel engine.

Exemplary embodiments of the present disclosure are also directed to an electric drive mounting platform that enables easy assembly, service, and inspection of under-the-hood components.

Aspects of the present disclosure relate to conversion of conventional internal combustion engine vehicles to electric vehicles and/or simultaneous production of each. In an aspect, the present disclosure provides a platform for different electric drive components and accessories that are employed for supporting an electric motor (other than the electric motor itself and the batteries). The platform can be mounted on a chassis frame of a vehicle in a space vacated by an internal combustion engine (i.e., within the engine compartment), thereby facilitating conversion of an internal combustion engine drive vehicle to an electric drive vehicle. Thus, the disclosed platform provides a unique design solution for converting conventional fueled vehicles into electric vehicles. For example, the electric class 5-8 semi-truck/tractor with conventional vehicle architecture can be converted into an electric vehicle by replacing the under-the-hood engine assembly with the platform, keeping vehicle dynamics in mind. In some embodiments, the platform can be mounted in a space that is configured to receive an internal combustion engine (i.e., the engine compartment), thereby enabling simultaneous in-line production of electric vehicles and internal combustion engine vehicles.

In an aspect, the platform is an assembly of structural members, high voltage accessories, low voltage components, radiators, fans, surge tanks, hoses, pipes, and wiring, with a purpose to replace the complete under-the-hood engine assembly conventionally arranged in the engine compartment upon being inserted into the engine compartment. The invention also supports necessary functions essential for semi-truck/tractor operation. The platform is mounted to the frame rails using a three-point isolator mounting system. The mounting system is designed to provide proper distribution of weight for semi-truck/tractor applications, thereby ensuring appropriate traction associated with a front axle of the vehicle.

In an aspect, the platform includes a backbone frame and a tower frame secured to the backbone frame in a position towards a vehicle front. The backbone frame and the tower frame are secured to the chassis frame through a three-point isolator mounting system. The platform further includes a plurality of electric drive components (other than the electric motor and batteries) that support the essential functions for operating the electric vehicle, secured to the backbone frame and the tower frame.

In an aspect, the three-point isolator mounting system includes casted mounts and provides proper distribution of weight and traction to a front axle of the vehicle. In an embodiment, the casted mounts utilized for mounting the platform can also be utilized (or have been utilized, as the case may be) for mounting an internal combustion engine.

In an aspect, the backbone frame can be made of square tubular pieces, the tubular pieces being cut to length and welded together.

In an aspect, the tower frame is a component of a cooling module and the backbone frame is a component of a primary module, each module including a plurality of isolators for mounting a plurality of electric drive components, the isolators being configured for reducing vibrations.

In an aspect, the plurality of electric drive components associated with the primary module includes one or more of: a brake retarder, a DC-DC voltage converter, an HVAC compressor, one or more inverters, heating resistors, a low voltage batteries package, a high voltage air compressor, and a plurality of pumps.

In an aspect, the brake retarder can include a water reservoir directly mounted below the backbone to dissipate excess energy regenerated by electric motors during downhill operation.

In an aspect, a plurality of electric drive components associated with the cooling module includes a radiator package having a plurality of cooling circuits. In some embodiments, the radiator package includes battery radiators, electric axle and high-voltage accessories cooling system radiator, air conditioning (HVAC) condenser, cooling fans corresponding to the different radiators, baffles, and a shroud.

In an aspect, the radiator package is arranged such that the battery radiators are placed in front of the electric axle and high-voltage accessories cooling system radiator so that a lower temperature is maintained for the batteries. Plumbing in respect of the battery radiators can be located on one side, whereas plumbing in respect of the electric axle and high-voltage accessories cooling system radiator can be located on the opposite side.

In an aspect, the cooling module can be configured to hold a hood of the vehicle from tipping over with hood straps.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments explained herein relate to a platform providing a unique design solution for converting a conventional internal combustion engine-based vehicle into an electric vehicle and/or for simultaneous production of each. For example, the electric class 5-8 semi-truck/tractor with conventional vehicle architecture can be converted into an electric vehicle by replacing its under-the-hood engine assembly with the proposed platform, as well as the addition of high-voltage batteries and one or more electric motors. In an aspect, arranging the platform at a location where an internal combustion engine was (or could have been) installed helps to ensure that distribution of weight for semi-truck/tractor application is maintained, such as by ensuring appropriate traction associated with a front axle of the vehicle. Specifically, semi-trucks/tractors are designed with the assumption that the front of the semi-truck/tractor will be significantly heavier than the rear portion due to the engine and supporting components being located in the engine compartment at the front of the semi-truck/tractor. As used herein, the term engine compartment should be understood as the portion of the semi-truck/tractor that is covered by the hood, regardless of whether or not an internal combustion engine is located in the engine compartment. Specifically, as detailed below, the space in the engine compartment normally occupied by an internal combustion engine and supporting components (e.g., alternator, distributor, radiator and cooling components, etc.) is used for components supporting the electric motor and battery.

The platform is an assembly of structural members, high voltage accessories, low voltage components, radiators, fans, surge tanks, hoses, pipes, and wiring, with a purpose to replace complete under-the-hood engine assembly, and be inserted into the under-the-hood space. The platform supports necessary functions essential for operation of the semi-truck/tractor, such as electric drive-based operations. In some embodiments, the platform is mounted to the frame rails using a three-point isolator mounting system, such as those utilized with conventional internal combustion engine systems. The mounting system is designed to provide proper distribution of weight for semi-truck/tractor applications and deliver appropriate traction to front axle.

Figure 1:
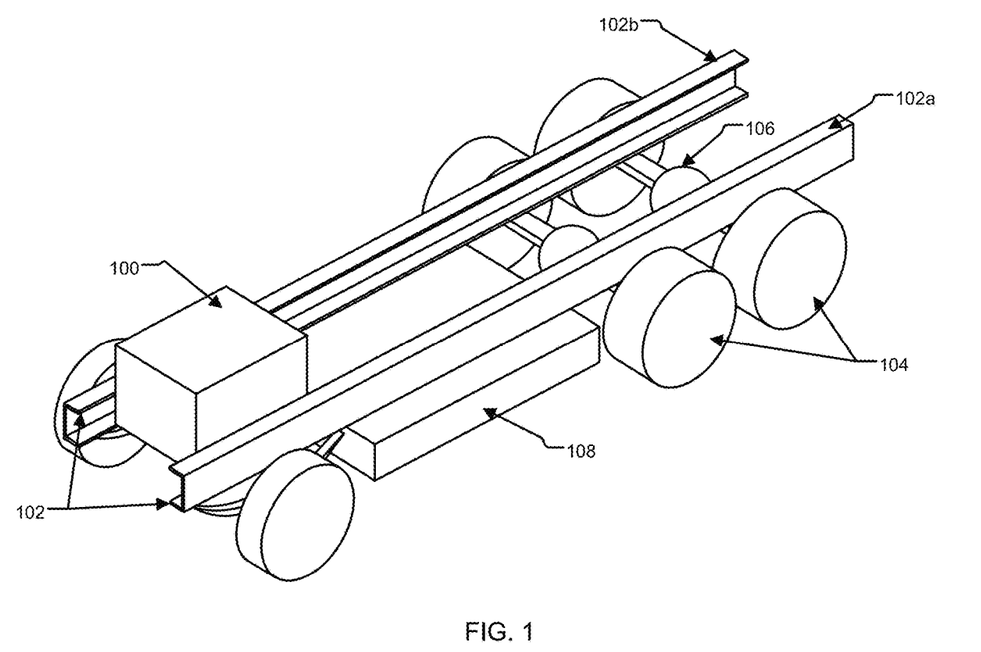
FIG. 1 is a schematic diagram of a chassis frame of a vehicle showing a location of the platform, in accordance with an embodiment of the present disclosure.

FIG. 1 illustrates a general diagram showing structure of a vehicle in accordance with an embodiment of the present disclosure. As shown, the vehicle includes a chassis frame 102 to which different aggregates are secured. The chassis frame 102 includes a left hand side frame rail 102a and a right hand side frame rail 102b. The components include wheels 104 (only two of which are labeled) operatively coupled with an electric motor 106, both being part of an electric axle (e-axle), which is secured to the chassis frame 102. In the illustrated embodiment, one electric motor 106 is coupled to drive the rear-most set of tires and a second electric motor (not labeled) is coupled to drive the set of tires between the rear-most and the front most set of tires. Although FIG. 1 illustrates each of the two rear axles as carrying only a pair of tires, it should be recognized that each of the two rear axles can carry four tires, two on each side of the chassis frame 102. The electric motor 106 is powered one or more batteries 108 secured to the chassis frame 102. In the illustrated embodiment, the one or more batteries 108 are arranged on the chassis frame in the area normally occupied by the fuel tanks when the semi-truck/tractor is powered by an internal combustion engine. In an embodiment, the vehicle further includes a platform 100 mounted on the chassis frame 102, the platform including a plurality of components and accessories that support the electric motor. In some embodiments, the platform includes all components and accessories for supporting the electric motor (other than the electric motor itself and the one or more batteries) to perform operations traditionally performed by an internal combustion engine system. These components include the backbone frame, the tower frame, the brake retarder, DC-DC voltage converter(s), HVAC compressor, heating resistor(s), low-voltage batteries package, high-voltage air compressor, pumps (e.g., water cooling pumps), cooling module, the inverter controller for controlling the speed of the electric motor(s), and the battery management system that reports information regarding the batteries to a main vehicle controller. Those skilled in the art will recognize that the inverter controller and battery management system do not directly communicate with each other but instead communicate (i.e., send reports and listen for commands) from the main vehicle controller, which controls not only the components and accessories supporting the electric motor but also other components of the vehicle, such as the braking system, stability system, occupant protection system (e.g., airbags), etc. The main vehicle controller can be, but need not be, part of the platform.

In some embodiments, the platform 100 is designed to replace existing under-the-hood engine assembly of existing gasoline or diesel trucks, semi-trucks, tractors, or the like, and convert the vehicles to electric vehicles. In other embodiments, the platform can be used on a common chassis frame 102 to form an electric drive semi-truck/tractor, where the common chassis frame 102 can alternatively be used to form an internal combustion engine vehicle.

Figure 2A:
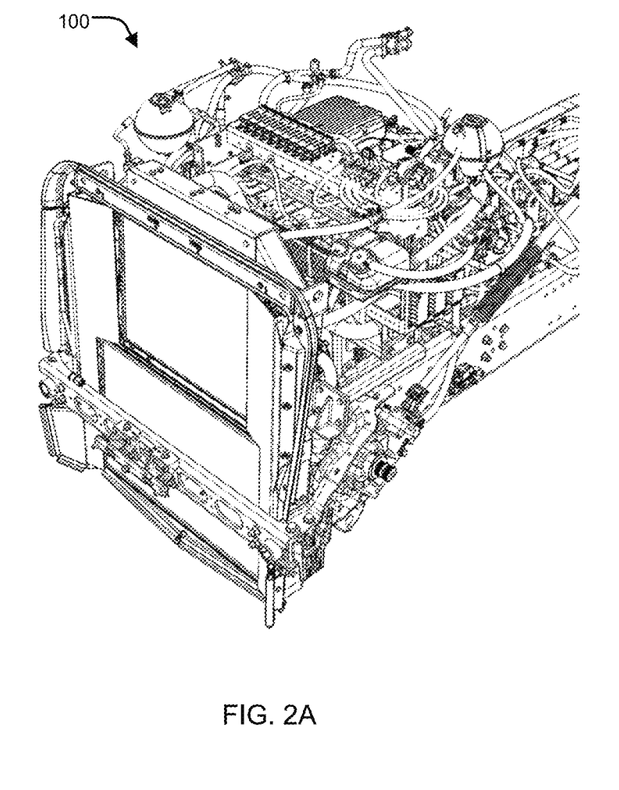
FIGS. 2A and 2B illustrate different views of the platform, in accordance with an embodiment of the present disclosure.
Figure 2B:
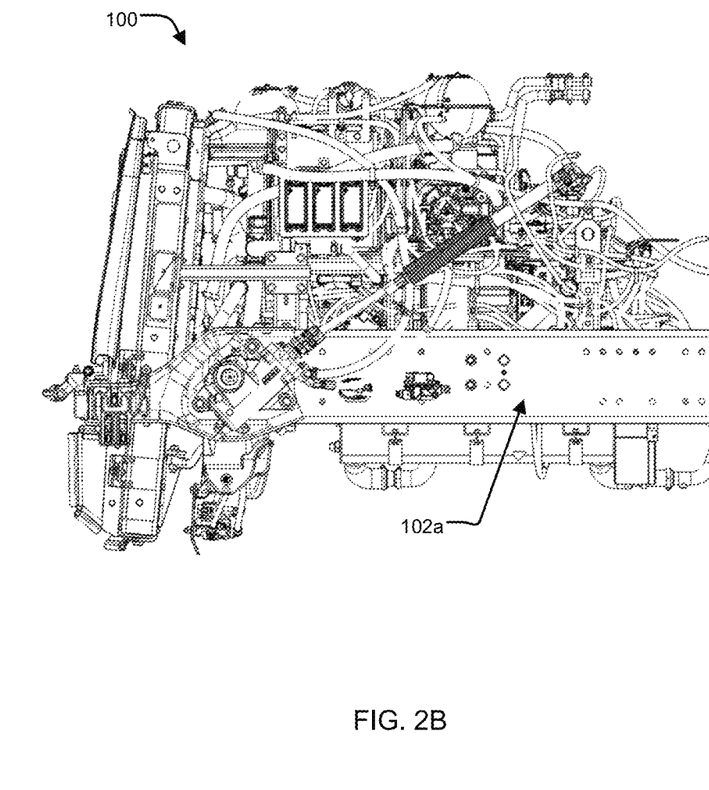

FIGS. 2A and 2B illustrate different views of the platform 100 in accordance with an embodiment of the present disclosure. As mentioned earlier, the platform 100 is designed to replace existing under-the-hood engine assembly of existing gasoline or diesel trucks, semi-trucks, tractors, or the like vehicles, and convert the vehicles to electric vehicles. It will be appreciated that "converting" an internal combustion engine vehicle to an electric vehicle does not require that an internal combustion engine to have been installed in the vehicle, such as when the platform is installed in a vehicle—regardless of whether the platform is installed during production or after production of the vehicle—when an internal combustion engine could have been installed instead.

Figure 3A:
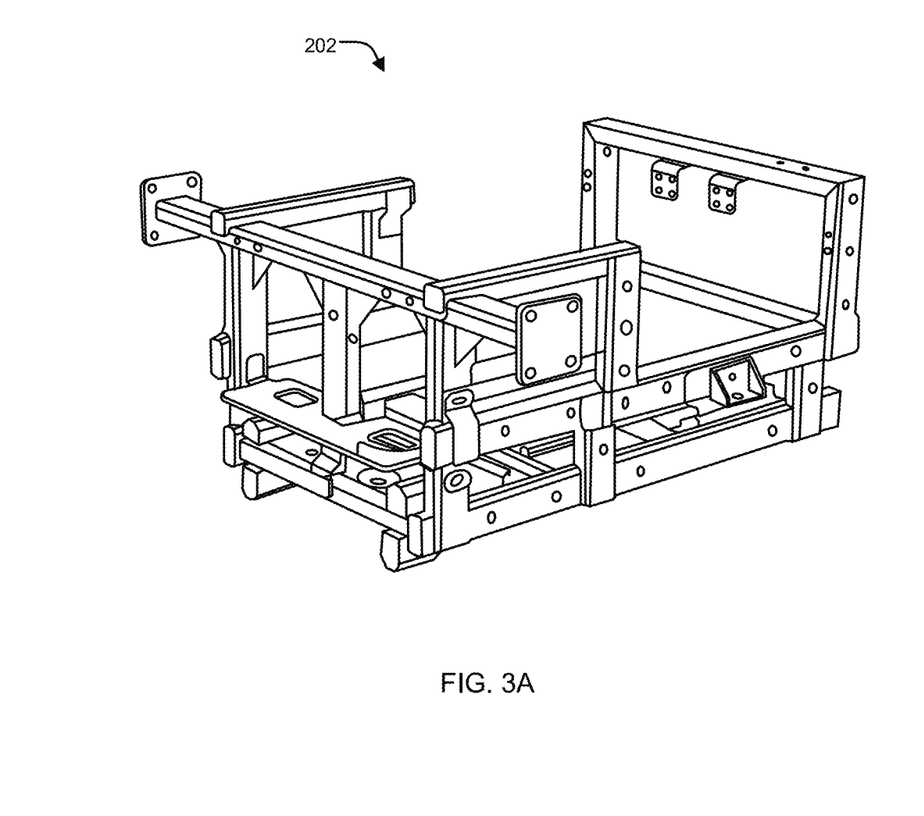
FIGS. 3A and 3B illustrate different views of structural components of the platform, in accordance with an embodiment of the present disclosure.
Figure 3B:
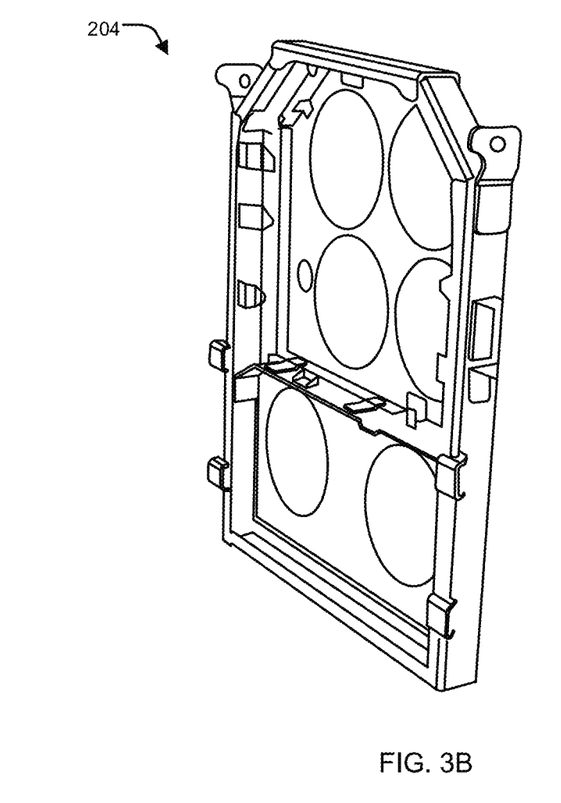

FIGS. 3A and 3B illustrate different views of structural components of the platform 100 in accordance with an embodiment of the present disclosure. In an embodiment, the platform 100 includes a backbone frame 202, and a tower frame 204 secured to the backbone frame. FIG. 3A provides a detailed outline of the backbone frame 202, and FIG. 2B provides a detailed outline of the tower frame 204. In an embodiment, the tower frame 204 is configured to be secured to the backbone frame 202 through a pair of casted mounts, such as those used with conventional systems. The tower frame 204 further shares a secondary connection with the backbone frame 202. In an embodiment, the secondary connection is a solid connection on the left hand side rail 102a and the right hand side rail 102b, forming a three-point isolator mounting system. In an embodiment, the electric drive essentials platform 100 is configured to replace existing under-the-hood engine assembly frame for converting conventional internal combustion engine vehicles to electric drive vehicles.

Figure 4:
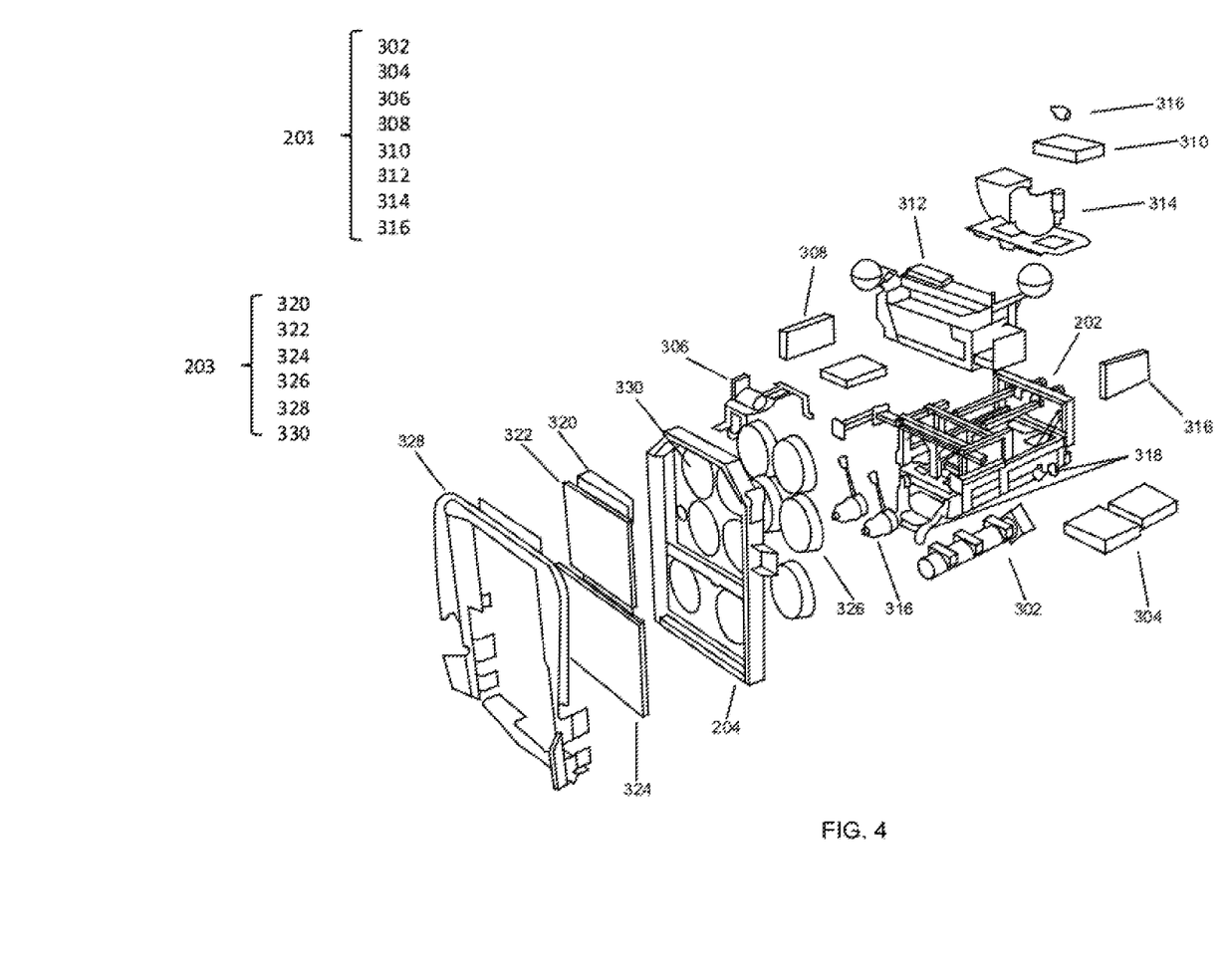
FIG. 4 illustrates an exploded block diagram depicting various electric drive components of the platform, in accordance with an embodiment of the present disclosure.

FIG. 4 illustrates an exploded block diagram depicting various electric drive components configured to be secured directly or indirectly to the backbone frame 202 and/or the tower frame 204 in accordance with an embodiment of the present disclosure, thereby forming part of a primary module 201 and/or a cooling module 203, respectively. An electric semi-truck or tractor equivalent has many functions that need to be supported with auxiliary components. Due to the lack of a rotating mass (i.e., lack of an internal combustion engine), auxiliary components can be mounted in various positions and orientations, which provides flexibility for component mounting as well as the ability to mount application specific components per customer requirements. Specifically, the platform 100 serves a purpose to provide adequate mounting for all required electric drive components.

Referring to FIGS. 3A, 3B, and 4, collectively, some embodiments of the backbone frame 202 are made of a plurality of elongated elements, such as square tubular pieces. In some embodiments, each elongated element is cut to length and secured one or more other elongated elements, such as by welding the elongated elements together. In some embodiments, the elongated elements include a large cross-section, thereby allowing for a structurally sound design. In some embodiments, the backbone frame 202 defines a plurality of openings between elongated members, thereby allowing for better accessibility to service or remove any internal components. In an example, the backbone frame 202 is configured to support the main load of electric drive components, as well as various attachment brackets and other structures.

In some embodiments, the plurality of electric drive components associated with the backbone frame 202 include a brake retarder 302, such as a brake retarder associated with a conventional internal combustion system. In some embodiments, the brake retarder 302 is a torpedo shaped water reservoir used to dissipate excess energy regenerated by electric motors during downhill operation. In some embodiments, the brake retarder 302 is directly mounted below the backbone frame 202, thereby keeping heat generated by the brake retarder 302 away from other components. In some embodiments, the brake retarder 302 is turned on to dissipate energy during recuperation periods, such as in circumstances where the energy cannot be accepted by the batteries.

In some embodiments, the electric drive components include a DC-DC voltage converter(s) 304. The DC-DC voltage converters 304 are used to charge low voltage batteries directly from high-voltage source. The voltage converters 304 are mounted above the brake retarder 302 and are used to supply power to other high voltage components, which are mounted on the backbone frame 202. In some such embodiments, each such component is mounted above the voltage converter. In an example, two units of the voltage converter 304 are directly mounted to the backbone frame 202. In an example, the DC-DC voltage converters 304 replace the alternator of conventional internal combustion engine assembly.

In some embodiments, the electric drive components include an HVAC compressor 306. In an example, the HVAC compressor 306 is a conventional HVAC compressor that is converted to operate by a high-voltage driven motor. In an embodiment, the HVAC compressor 306 is mounted above the DC-DC voltage converter 304, such as by using a bracket.

In some embodiments, the electric drive components include an inverter(s) 308. In some such embodiments, the inverter 308 is mounted facing high voltage batteries and/or a power distribution unit, which facilitates better cable routing and servicing. In an embodiment, two inverters 308 are mounted above the DC-DC voltage converter 304, such as by using brackets. In some embodiments, each inverter 308 supports functionality of one or more heating resistors 310, one or more brake retarder 302, or the like.

In some embodiments, the electric drive components include heating resistors 310. In an example, one or more heating resistors 310 serves an important function in vehicle safety, such as those functions known in the art. In some embodiments, one or more heating resistors 310, such as a first heating resistor, is (or includes) a battery heater, such as a battery heater mounted above a DC-DC voltage converter 304. In some embodiments, one or more heating resistors 310, such as a second heating resistor 310, is (or is configured to function at least partially as) a cab heater. In some embodiments, a cab heater (or equivalent thereof) is mounted in close proximity to a cab heat circuit, at least when compared with one or more other heating resistor of the present invention. In some embodiments, the platform includes a cab heater positioned above a battery heater of the platform 100. In some such embodiments, the cab heater provides heating for the cabin of the vehicle and the battery heater provides heating for the batteries, such as in extremely cold ambient conditions.

In some embodiments, the electric drive components include a low-voltage batteries package 312. In some embodiments, the low-voltage batteries package 312 is provided on the backbone frame 202 at a position and in an orientation that provides good accessibility by a user while avoiding (or at least reducing possibility of) creating short circuits, such as by being mounted above all cooling components to avoid (or at least reduce the possibility of) coolant leakage onto the same. In an example, the low-voltage battery package 312 mounting provides additional attachment points for other components, such as radiator surge tank(s), power steering fluid surge tank(s), fuse boxes, low-voltage power distribution, low-voltage cut-off switch, and the like. In some embodiments, each high voltage and low voltage component that has a motor, such as low-voltage coolant pumps, low-voltage power steering pump, high-voltage air compressor, high-voltage AC compressor, and the like, are powered directly from an appropriate power source, such as LV or high-voltage power sources (i.e. batteries).

In some embodiments, the electric drive components include a high-voltage air compressor 314, such as those utilized with conventional internal combustion engine and/or electric drive systems. In some such embodiments, the air compressor 314 is mounted above other electric drive components using isolators to dampen vibrations caused by an associated high-voltage motor.

In some embodiments, the electric drive components include a plurality of pumps 316, such as those utilized with conventional internal combustion engines and/or electric drive systems. In some embodiments, the platform includes two water cooling pumps and two valves mounted in conjunction therewith. In some such embodiments, each water pump has low voltage motor and is mounted on isolators to reduce vibrations. In some embodiments, the platform includes a steering pump, such as a steering pump driven by a low-voltage motor and/or mounted on isolators to reduce vibrations.

In some embodiments, the backbone frame 202 includes casted frame mounts 318 that allow three-point mounting to a vehicle frame, such as three-point associated with conventional internal combustion engine vehicles. In an embodiment, the tower frame 204 connects to the backbone frame 202 using side supports and the casted frame mount 318, i.e., the three-point mounting system mentioned earlier, thereby engaging a cooling module 203 (associated with the tower frame) with a primary module 201 (associated with the backbone frame). In an embodiment, the cooling module 203 includes a complete radiator package having cooling circuits. Depending upon ambient conditions, the electric truck generally requires two or three cooling circuits working at all times during operation.

In an embodiment, the radiator package, and in turn the cooling module 203, includes one or more radiators, such as radiators configured to cool batteries (battery radiator 320), electric-axle and/or high-voltage accessories (cooling system radiator 322), or the like. In some embodiments, the cooling module includes and/or is associated with one or more air conditioning (HVAC) condenser 324, cooling fans 326, baffle 328, shroud 330, or the like.

In some embodiments, the cooling system is divided into two separate circuits, each with its own separate radiator(s)

320, 322. In this way, the cooling system is configured to accommodate different operating temperatures of different systems, such as different operating temperatures of batteries, e-axles, high-voltage accessories, low-voltage accessories, and/or the like. In some embodiments, the two radiators 320 and 322 are stacked with one positioned behind the other, thereby facilitating optimization of the same. In some embodiments, such as in embodiments where batteries have a lower operating temperature, a battery cooling system radiator 320 is placed in the front of an electric-axle and/or high-voltage accessories cooling system radiator 322. In some embodiments, an AC condenser associated with the platform is separated from main radiator bundle and placed behind a bumper of the vehicle, which is distinguishable from a location of the same in conventional semi-trucks and other vehicles. In case of the present invention, the AC condenser 324 can operate at any time without impacting overall performance of the radiator bundle.

In an embodiment, the baffle 328 is designed to be integrated with existing exterior geometry of an existing conventional semi-truck/tractor, for example Cascadia P4 116 BBC. In some embodiments, a shroud 330 of the cooling module 203 is configured to hold six electric fans 326. The fans 326, which are typically operated by an internal combustion engine crankshaft in the conventional vehicle architectures, are now completely isolated from other components and can turn on and off on demand. In some embodiments, each fan 326 is operated by one or more low-voltage battery. In this way, the cooling module of the present invention allows for a more efficient operation of the cooling systems than is achievable with conventional systems. In some embodiments, the radiators 320, 322 and/or the condenser 324 are in thermal communication with one or more components of the primary module 201 (such as pumps, valves, coolant surge tanks, and the like) via coolant lines, such as soft and/or flexible hoses that are configured to facilitate ease of serviceability and/or routing. In an embodiment, the cooling module 203 is also configured to interface with the hood of the vehicle, thereby preventing or otherwise inhibiting the same from tipping. In some embodiments, the cooling module 203 interfaces with the hood via one or more mechanical devices, such as one or more hood straps or the like.

In some embodiments, the thermal communication between the cooling module 203 and components of the primary module 201 (i.e., valves, pumps, coolant surge tanks, and the like) is accomplished by flowing a coolant fluid through the coolant lines. In some such embodiments, the system for and methods of doing the same is very complex. In some embodiments, a right hand side rail 102*b* of the vehicle frame is dedicated to the plumbing of an electric-axle and/or high-voltage accessories cooling system, and a left hand side rail 102*a* is dedicated for battery plumbing, i.e., the plumbing for carrying coolant between the platform 100 and the one or more batteries 108. In some embodiments, this separation divides the valve, pump, and coolant surge tank for each system accordingly to the established layout. In some embodiments, the electric-axle and high-voltage accessories cooling system plumbing is more involved due to most of high-voltage auxiliaries being associated with the primary module 201.

Figure 5:
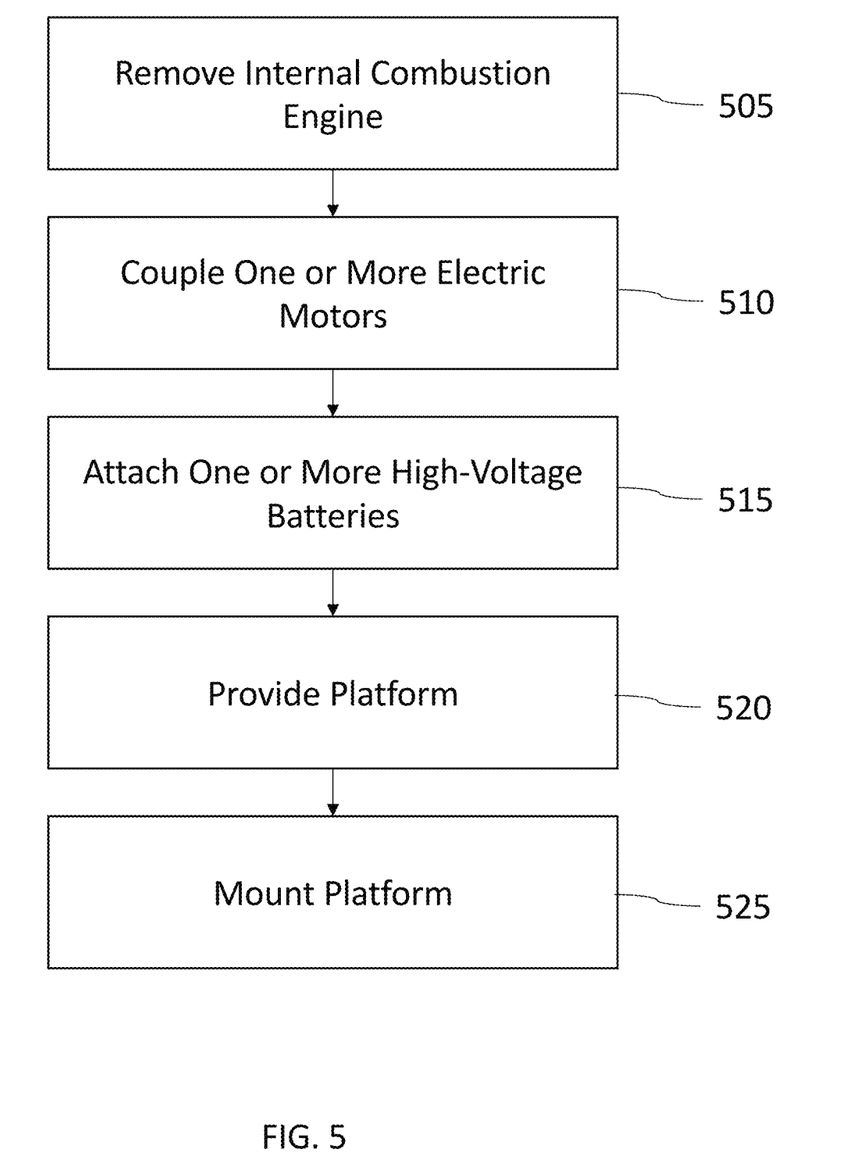
FIG. 5 is a flow diagram of a method for installing a platform in accordance with an embodiment of the present disclosure.

A method for converting a conventional internal combustion engine vehicle to an electric vehicle will now be described in connection with the flowchart of FIG. 5. Initially, the internal combustion engine and all supporting components in the engine compartment are removed from the engine compartment (step 505). Next, one or more electric motors 106 are coupled to one or more axles of the vehicle (step 510) and one or more high-voltage batteries 108 are attached to the vehicle (step 515). A platform 100 is provided (step 520). The platform includes a backbone frame 202, a tower frame 204 secured to the backbone frame 202, the tower frame 204 being positioned towards a front of the vehicle, and a plurality of electric drive components that support operation of the one or more electric motors 106. The plurality of electric drive components are secured to the backbone frame 202 and/or the tower frame 204. The platform 100 is then mounted in the engine compartment of the vehicle by securing the backbone frame 202 and tower frame 204 to the chassis frame 102 via a three point isolator mounting system (step 525). It should be recognized that the order of steps in FIG. 5 is merely exemplary and the steps can be performed in any order. Specifically, the platform can be installed prior to the one or more high-voltage batteries. Likewise, the one or more batteries can be installed prior to the one or more electric motors, as well as can be installed after the one or more electric motors are installed. Further, although not illustrated, the method can also involve coupling the components of the platform 100 to the one or more batteries 108 and the one or more electric motors 106.

As will be appreciated from the discussion above, the present disclosure provides an efficient and cost-effective solution that meets the requirement of converting a conventional internal combustion engine vehicle to an electric vehicle. Further, the present disclosure provides an assembly or platform for mounting and installation of all of the components and accessories (other than the battery) that support an electric motor. Further, the present disclosure provides an electric drive mounting platform that fits within a conventional vehicle architecture. The present disclosure also provides an electric drive mounting platform that fits within a space vacated by an internal combustion engine of a vehicle. The present disclosure further provides a platform that enables easy assembly, service, and inspection of under-the-hood components.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A platform for an electric vehicle, the platform comprising:
    a backbone frame having a side facing towards a front of the vehicle;
    a tower frame secured to the side of the backbone frame facing towards the front of the vehicle, wherein the backbone frame and the tower frame are secured to the chassis frame through an isolator mounting system; and
    a plurality of electric drive components that support operation of an electric motor of the electric vehicle, secured to the backbone frame or the tower frame,
    wherein the platform is configured for installation in an engine compartment of the vehicle, and
    wherein the tower frame is a component of a cooling module and the backbone frame is a component of a primary module, each module including a plurality of isolators for mounting the plurality of electric drive components, the isolators being configured for reducing vibrations.

2. The platform of claim 1, wherein the isolator mounting system includes casted mounts and are located to provide proper distribution of weight and traction to a front axle.

3. The platform of claim 1, wherein the backbone frame is made of a plurality of square tubular pieces, the square tubular pieces being cut to length and welded together.

4. The platform of claim 1, wherein the plurality of electric drive components associated with the primary module includes one or more of: a brake retarder, a DC-DC voltage converter, an HVAC compressor, one or more inverters, an inverter controller, heating resistors, a low voltage batteries package, a high voltage air compressor, a battery management system, and a plurality of pumps.

5. The platform of claim 4, wherein the brake retarder includes a water reservoir directly mounted below the backbone to dissipate excess energy regenerated by electric motors during downhill operation.

6. The platform of claim 5, wherein the cooling module includes a plurality of electric drive components including a radiator package having a plurality of cooling circuits and mounted on the cooling module, wherein the radiator package includes battery radiators, an electric-axle and high-voltage accessories cooling system radiator, an air conditioning (HVAC) condenser, cooling fans corresponding to the different radiators, baffles, and a shroud.

7. The platform of claim 6, wherein the radiator package is arranged such that the battery radiators are placed in front of the electric-axle and high-voltage accessories cooling system radiator so that a lower temperature is maintained for the batteries, and wherein plumbing in respect to the battery radiators is located on one side, and plumbing in respect to the electric-axle and high-voltage accessories cooling system radiator is located on an opposite side.

8. The platform of claim 1, wherein the cooling module is configured to hold a hood of the vehicle from tipping over with hood straps.

9. The platform of claim 1, wherein the isolator mounting system is a three point isolator mounting system.

10. A method for converting a vehicle from being driven by an internal combustion engine to being driven by one or more electric motors, wherein the vehicle includes an engine compartment containing an internal combustion engine and supporting components, the method comprising:

removing the internal combustion engine and supporting components in the engine compartment from the engine compartment;

coupling one or more electric motors to one or more axles of the vehicle;

attaching one or more high-voltage batteries to the vehicle;

providing a platform, wherein the platform comprises a backbone frame having a side facing towards a front of the vehicle, a tower frame secured to the side of the backbone frame facing towards the front of the vehicle, and a plurality of electric drive components that support operation of the one or more electric motors, wherein the tower frame is positioned towards a front of the vehicle, and the plurality of electric drive components are secured to the backbone frame or the tower frame;

mounting the platform in the engine compartment of the vehicle by securing the backbone frame and tower frame to the chassis frame via an isolator mounting system; and coupling the plurality of electric drive components to the one or more electric motors and the one or more high-voltage batteries.

\* \* \* \* \*